W. A. McCARRELL.
TRANSMISSION MECHANISM.
APPLICATION FILED NOV. 1, 1917.

1,317,376.

Patented Sept. 30, 1919.
6 SHEETS—SHEET 3.

Inventor:
William A. McCarrell
By Allen Webster
Att.

W. A. McCARRELL.
TRANSMISSION MECHANISM.
APPLICATION FILED NOV. 1, 1917.

1,317,376.

Patented Sept. 30, 1919.
6 SHEETS—SHEET 5.

Inventor:
William A. McCarrell
By Allen Webster
Atty.

UNITED STATES PATENT OFFICE.

WILLIAM A. McCARRELL, OF MILWAUKEE, WISCONSIN, ASSIGNOR TO ALLINMESH TRANSMISSION COMPANY, OF SPRINGFIELD, MASSACHUSETTS, A CORPORATION OF MASSACHUSETTS.

TRANSMISSION MECHANISM.

1,317,376.  Specification of Letters Patent.  Patented Sept. 30, 1919.

Application filed November 1, 1917. Serial No. 199,641.

*To all whom it may concern:*

Be it known that I, WILLIAM A. McCARRELL, a citizen of the United States of America, residing in Milwaukee, in the county of Milwaukee and State of Wisconsin, have invented new and useful Improvements in Transmission Mechanism, of which the following is a specification, reference being had to the accompanying drawings and letters of reference marked thereon.

The object of my invention is to provide an improved transmission mechanism which is strong and durable in construction, convenient and sure in manipulation, and silent and efficient in action, and while the same is especially designed for automobiles it may be employed in other installations wherein it becomes desirable to transmit motion and power at variable speeds.

I accomplish the objects of my invention by the construction herein pointed out.

In the accompanying drawings in which like numerals indicate like parts—

Now referring to the construction and operation of the specific mechanism illustrated in the accompanying drawings, a suitable case 1 is provided in which is mounted the main-shaft comprising the driving part 3 and the driven part 4, the counter-shaft 5 and the reverse-shaft 6. Upon these shafts all of the gearing is mounted and the clutches are mounted on the main-shaft.

The shifting mechanism is mounted in part 2 of the case.

The driving part 3 of the main-shaft has mounted upon it gears 7, 8 and 9, which gears are fixed against lateral movement on said shaft, but are free to revolve thereon, or to state it more accurately in which gears the shaft is free to revolve, until locked thereto as hereinafter described. The driven part 4 of the main-shaft has a gear 12, loosely mounted on it, said gear having sliding movement by means of which it is brought into locking engagement and thereby locked to the driven part of the shaft.

Clutches 10 and 11 are mounted upon the driving part 3 of the main-shaft and are locked against rotation thereon but have sliding movement to engage adjacent clutching elements. The gear 7 is provided with clutch elements on its face adjacent clutch 10 which clutch is adapted to be moved so as to bring its clutching elements into locking engagement with the clutching elements of gear 7 and this clutch is also adapted to be moved toward gear 8, which gear is provided with clutching elements so that movement of the clutch 10 a sufficient distance toward gear 8 will bring the adjacent clutching elements into locking engagement. The engagement of the locking elements of either of these gears with clutch 10 will lock such gear to its shaft so that the gear and shaft will revolve together. The gear 9 is provided with clutching elements and when clutch 11 is moved the requisite distance toward gear 9 this gear becomes locked to and will rotate with the shaft upon which it is mounted. A clutch 13 is mounted upon and fixed to the driven part 4 of the main-shaft and is provided with clutching elements projecting in both directions so that if gear 12 be moved toward clutch 13 to bring the clutching elements into locking engagement then gear 12 becomes locked to the driven part 4 of the main-shaft and revolves therewith. If clutch 11 be moved to carry its clutch engaging elements into locking engagement with the adjacent clutch elements of clutch 13 then the driving and the driven parts of the main-shaft will become locked and rotate together.

The counter-shaft 5 has gears 14, 15, 16 and 17 mounted and fixed thereon.

Reverse-shaft 6 is provided with gears 18 and 19 fixed to rotate together. These may be both fixed to a rotating shaft or both rotate on shaft 6 the latter being preferable. For manufacturing purposes it is advisable that gears 18 and 19 be made separately and secured so as to rotate together although the two may be made integral.

The gear 18 mounted on reverse-shaft 6 is in constant mesh with gear 7 mounted on part 3 of the main-shaft. Gear 19 on the reverse-shaft 6 is in constant mesh with gear 14 on counter-shaft 5. Gear 8 on part 3 of the main-shaft is in constant mesh with gear 15 on counter-shaft 5. Gear 9 on part 3 of the main-shaft is in constant mesh with gear 16 on counter-shaft 5. Gear 12 on part 4 of the main-shaft is in constant mesh with gear 17 on counter-shaft 5.

The shifting mechanism illustrated is constructed and operates as follows:—

Three shifting rods 20, 21 and 22 are mounted in part 2 of the case. These rods have longitudinal movement. Each shifting rod has mounted on it a fork-carrying-member.

The fork 26 of the fork-carrying-member 23 mounted on shifting rod 20 is in engagement with clutch 11. The fork 27 of the fork-carrying-member 24 mounted on shifting rod 21 is in engagement with clutch 10, and the fork 28 of the fork-carrying-member 25 mounted on shifting rod 22 is in engagement with gear 12.

Two pair of rock-shafts are arranged transversely of the shifting rods; the first pair comprising rock-shafts 36 and 37 and the second pair comprising rock-shafts 38 and 39. See Fig. 8.

Cams or levers 40 and 41 are mounted on rock shafts 36 and 37 and these are geared together. See Figs. 1 and 8.

Like cams or levers 42 and 43 are mounted on rock-shafts 38 and 39 these being geared together in like manner.

The cam members 40 and 41 are adapted to engage bosses 47 and 48 on members 34 and 35 except that in one movement as hereinafter described one of these cams passes one of the bosses.

A cam or lever 54 is mounted on rock-shaft 38 which cam is adapted to engage lug 53 on member 52, the latter being mounted on and fixed to shifting rod 22. See Figs. 8 and 9.

Figure 11:
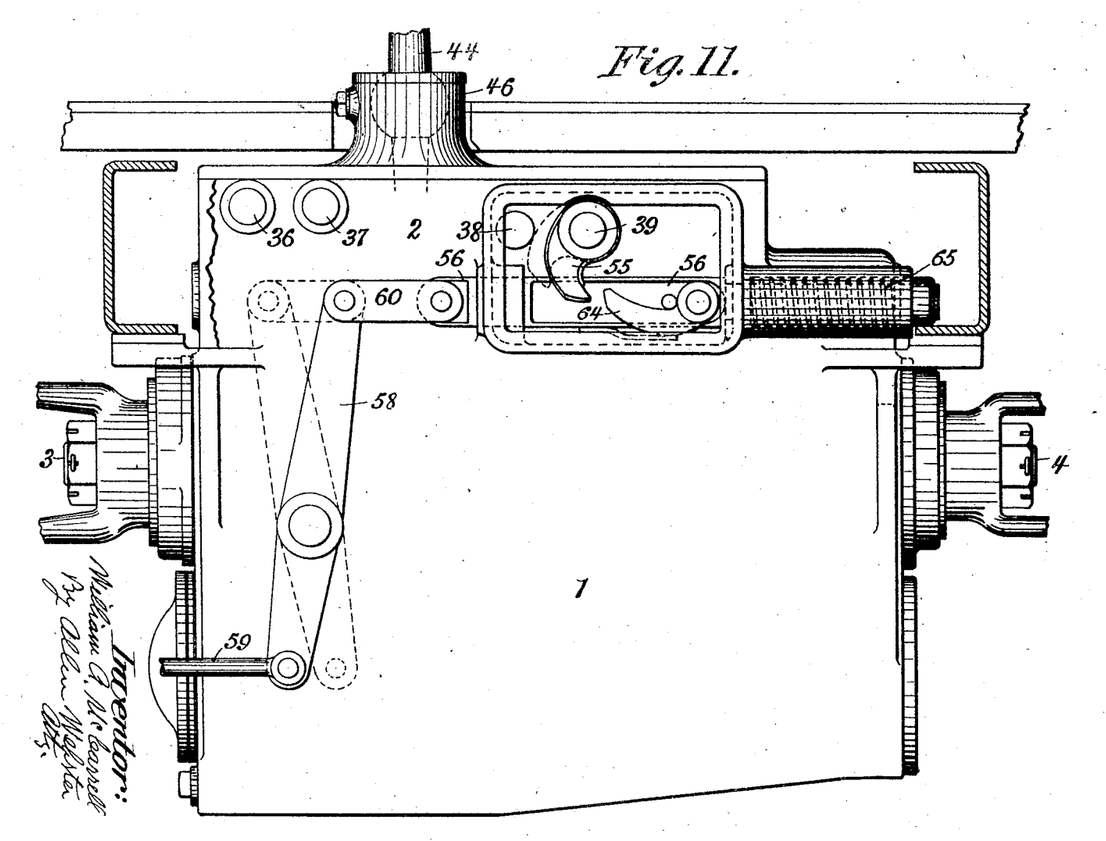
Fig. 11 is a side elevation showing the upper and lower case, a part of the upper case being shown in section and showing a part of the mechanism adapted to bring the parts to neutral position.
Figure 13:
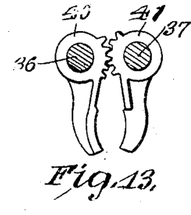
Fig. 13 is a section through one pair of rock shafts, showing a side view of the coöperating arms thereon.
Figure 14:
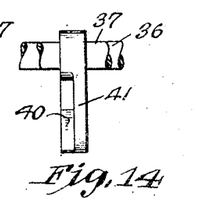
Fig. 14 shows an edge view of the arms illustrated in Fig. 13.

A cam or lever 55 is mounted on rock-shaft 39 adapted to be engaged by a pawl 64 mounted on neutralizing rod 56. See Figs. 8 and 11.

An arm or lever 50 is fixed to rock-shaft 36 the free end of which arm rests in the slot between walls 51 on member 49, the latter being fixed to shifting rod 22. See Figs. 8 and 9.

Figure 1:
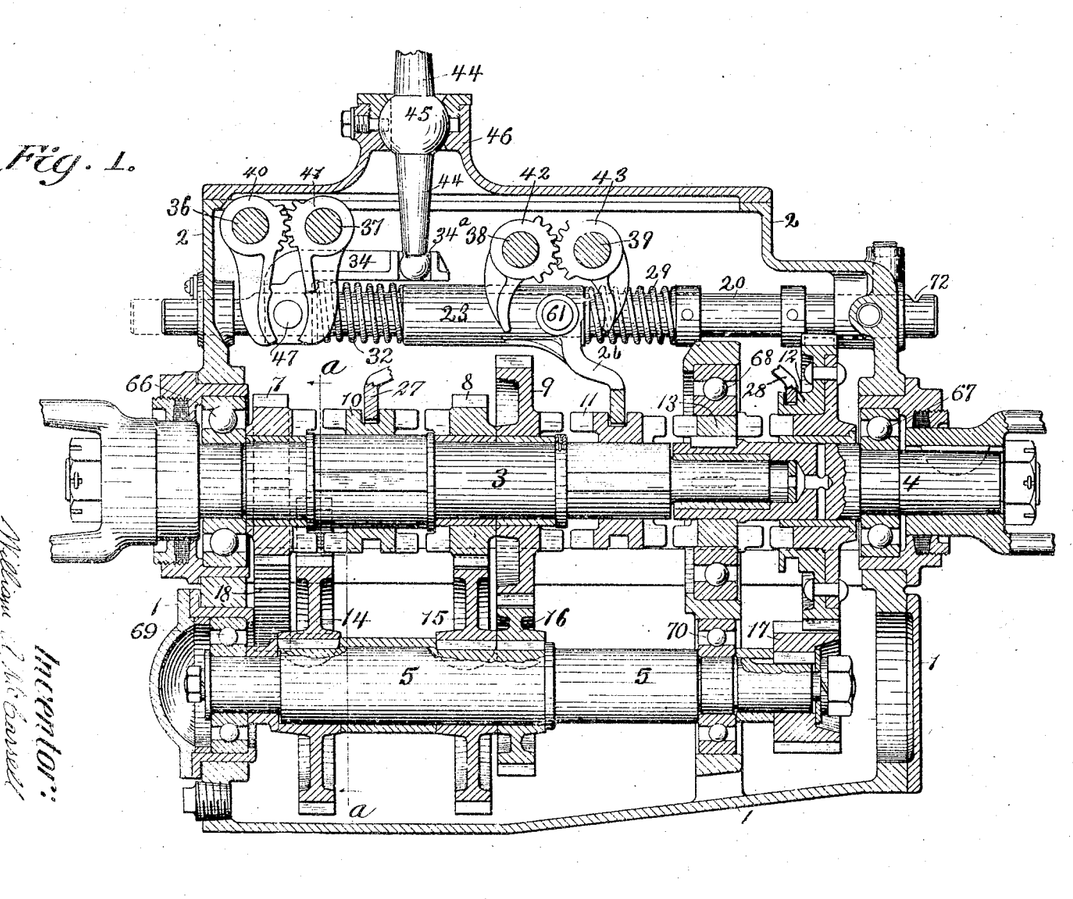
Figure 1 is a side elevation showing the main-shaft and first counter-shaft in full lines and showing the case, gears, bearings and clutch members in section on the plane indicated by dotted line *b—b* on Fig. 2. Also showing one of the shifting rods in full lines.
Figure 2:
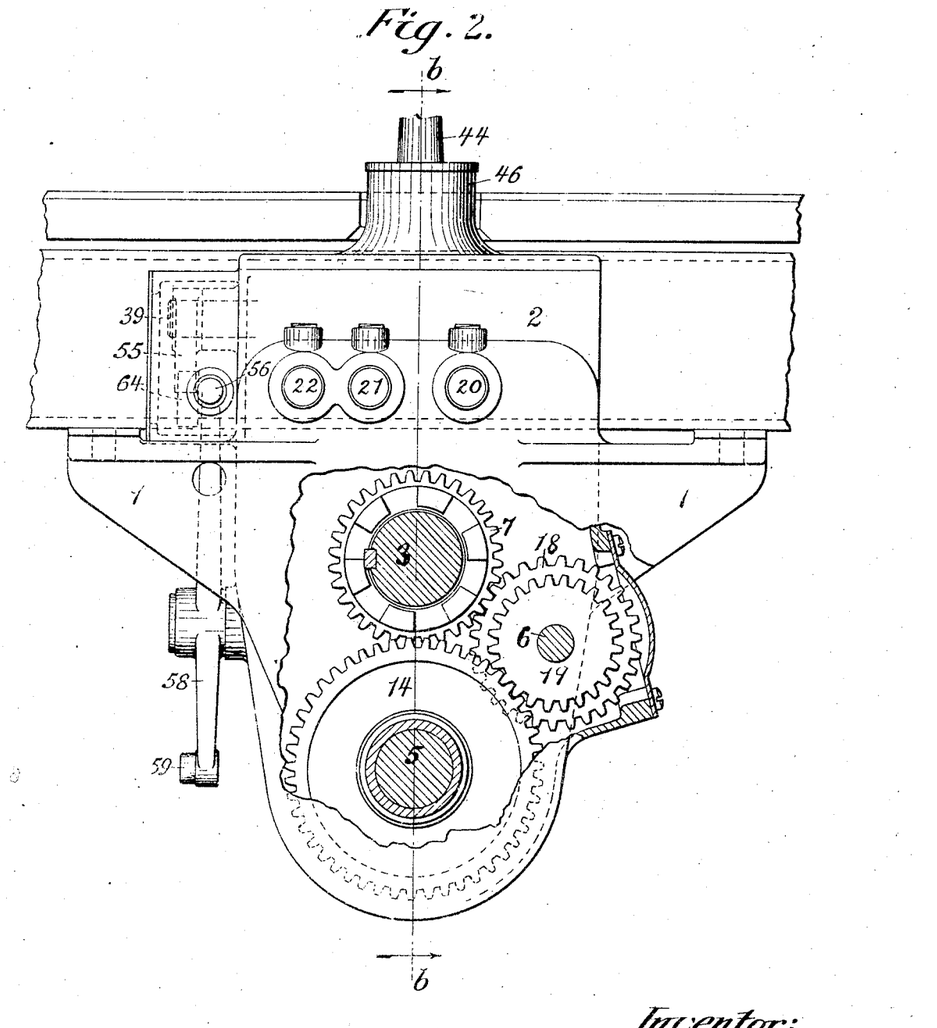
Fig. 2 is a view as seen from the driven end of the main-shaft taken on dotted line *a—a* of Fig. 1 and showing a part of the case broken away.
Figure 3:
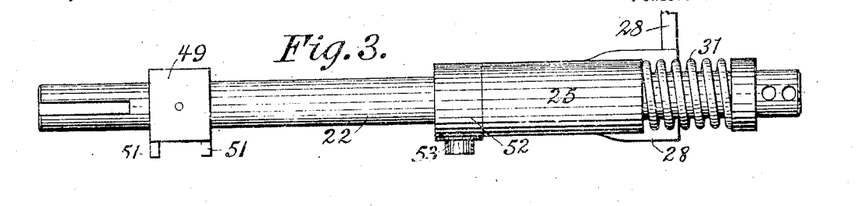
Figs. 3, 4, 5 and 6 are top and side views respectively of two of the shifting rods with part of their operative mechanism mounted thereon.
Figure 4:
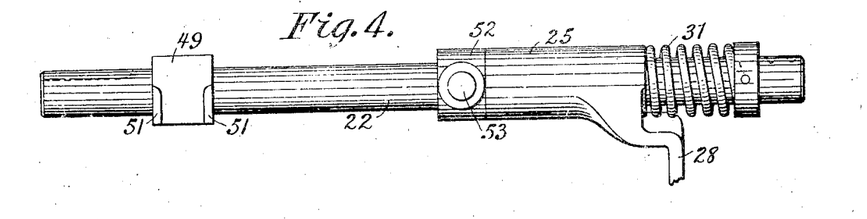
Figure 5:
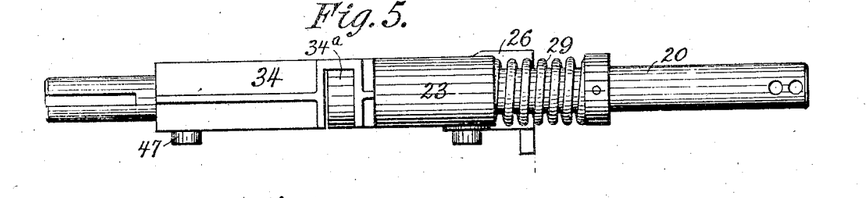

In the mechanism illustrated all shifts are made by moving the hand lever 44 so as to bring its inner end into the transverse slots 34$^a$ and 35$^a$ of the members 34 and 35 respectively mounted on shifting rods 20 and 21 respectively, this lateral movement being permissible because of the hand lever being provided with the ball and socket joint 45, mounted in housing 46, see Fig. 1, and thereafter the shifting operation is caused by either a forward or backward movement of the handle end of the shifting lever 44.

The operation is as follows:

It will be noted that when the mechanism is in neutral position that is when none of the clutching elements are in engagement if power be applied to the driving part 3 of the main-shaft nothing will revolve except said part 3.

If now it is desired to put the mechanism in position for the lowest speed ahead, the hand lever 44 is moved to carry its inner end into engagement with member 35 on shifting rod 21 and the handle end of the lever 44 moved forwardly thus moving member 35 rearwardly and moving shifting rod 21 in the same direction and as fork-body 24 is mounted on shifting rod 21 it moves in the same direction carrying with it its fork 27, the latter being in engagement with clutch 10, this clutch will be moved toward and into locking engagement with gear 8 thus locking gear 8 to part 3 of the main shaft.

The movement of the shifting rod 21 rearwardly carries the boss 48 on member 35 into engagement with the depending portion of the cam lever 41 mounted on rock-shaft 37 causing it to rotate, thus because of the geared connection between the cams 41 and 40 rotating rock-shaft 36 in reverse direction thus moving the free end of the arm 50 mounted on rock-shaft 36 forwardly and thus moving member 49 mounted on shifting rod 22 in the same direction, thus moving shifting rod 22 forwardly carrying with it fork body 25 mounted thereon and as the fork 28 is mounted on fork body 25 and is in engagement with gear 12, mounted on driven part 4 of the main-shaft, this gear will be moved forwardly and into locking engagement with clutch 13, thus locking gear 12 to the driven part 4 of the main-shaft. The parts are so adjusted that the movement of clutch 10 into engagement with gear 8 and movement of gear 12 into engagement with clutch 13 will be simultaneous. (The function of the springs on the shifting rods will be later pointed out).

The drive will then be through part 3 of the main-shaft, clutch 10, gear 8, gear 15, counter-shaft 5, gear 17, gear 12, clutch 13 and driven part 4 of the main-shaft to the mechanism to be driven.

The parts will remain in this position until returned to neutral so that no change can be effected until the parts are returned to the normal unlocked position. It will be seen that the operating lever cannot be moved to carry its inner end out of engagement with member 34 or 35 into the other until these parts are in registry and that they will be in registry only when the mechanism is in neutral position, i. e., as before explained, when all clutches are out of engagement.

It will also be seen that if the operating lever be moved to carry the shifting rod with which it is in operative engagement in a direction the reverse of the direction first given to put certain parts in locking engagement then such reverse movement will carry them out of engagement to neutral before the parts are placed in engagement with the elements to be engaged by such movement.

I prefer however, to return all the parts to neutral before any shift is made, thus leaving the mechanism open to any shift desired.

The preferred means for returning the parts to normal or neutral position comprises mounting a cam or lever 55 on rock-shaft 39 (see Fig. 11) and to provide a neutralizing rod 56, having sliding movement in suitable bearings, on which rod 56 I mount a spring pressed pawl 64 adapted to engage lever 55 when moved in one direction and to pass by it when moved in opposite direction. If now the neutralizing rod 56 be moved forwardly the pawl 64 will engage lever 55 and rotate rock-shaft 39, thus rotating cam or lever 43 in the same direction and because of the geared connection rotating cam or lever 42 in reverse direction. The depending portions of these cams or levers engage bosses 61 and 62 on fork bodies 23 and 24, (see Figs. 7 and 8) thus moving the fork body of the fork in engagement with the clutch then in locking position back to normal or neutral, thus moving such clutch out of engagement to its neutral position. The rotation of the cam member 42 will rotate the rock-shaft 38 to which it is fixed, thus rotating cam member 54 mounted also on rock-shaft 38, the free or depending portion of which cam engages the boss 53 on member 52 mounted on shifting rod 22 and as the fork 28 of fork body 25 mounted on shifting rod 22 is in engagement with gear 12, the latter will be moved out of engagement with clutch 13 simultaneously with the disengagement of the other clutch elements.

One method of moving said neutralizing rod 56 comprises the employment of a rod 59 extending to a foot piece (not shown), said rod 59 being pivotally attached to a lever 58, the latter being pivotally mounted between its ends, the opposite end being connected with the neutralizing rod 56 by a link 60, a spring 65 serves to automatically return the neutralizing rod 56 to its normal position and during such return movement the spring pressed pawl 64 passes the end of cam or lever 55 without causing any movement of this cam or the parts to which it is attached.

In order to move the parts to the position for second or next higher speed ahead the inner end of operating lever 44 is moved to engage member 34 fixed to shifting rod 20 and the handle end moved rearwardly, thus moving shifting rod 20 forwardly carrying with it fork body 23 mounted upon it and as fork 26 is mounted on fork body 23 and is in engagement with clutch 11 this clutch will be moved in the same direction toward and into engagement with clutch elements of gear 9; and at the same time boss 47 on member 34 engages lever or cam 40 mounted on rock-shaft 36 rotating the latter thus moving the arm 50 mounted on rock-shaft 36 in a direction to move shifting rod 22 forwardly and through fork 28 of fork body 25 on shifting rod 22, said fork being in engagement with gear 12 moving the latter into engagement with clutch 13, the movement of clutch 11 to engage gear 9 and of gear 12 to engage clutch 13 being simultaneous.

The drive will then be through driving part 3 of main-shaft, clutch 11, gear 9, gear 16, counter-shaft 5, gear 17, gear 12, clutch 13 and driven part 4 of main-shaft to the mechanism to be driven.

For direct or highest speed ahead, the parts having been returned to neutral, the inner end of operating lever 44 is put into engagement with member 34 on shifting rod 20 and the handle end moved forwardly thus through the elements before described, moving clutch 11 rearwardly (see Fig. 1) and into engagement with clutch 13, thus locking the two parts 3 and 4 of the main-shaft together and providing an unbroken straight drive with none of the gearing moving excepting such as might be incident to a slight creeping because of slight friction between the shafts and gears, such motion, however, is noiseless and not objectionable from a mechanical point of view as it tends to prevent any wear in the gears at any fixed point.

It is to be noted that the arm of cam or lever 41 is so constructed i. e., is of less thickness than the arm on cam 40 or is cut away on the side toward boss 47, so that a movement of shifting rod 20 to cause clutch 11 to engage clutch 13 for high speed, does not put in operation the mechanism before described to simultaneously move gear 12 as boss 47 passes the thinner or cut away portion of lever 41 and therefore does not operate it or any of the attached parts. So that the movement of the parts for direct high speed simply locks the driving and driven parts of the main-shaft together and leaves all the other parts in neutral or inoperative position.

For reverse drive the operation is as follows: The parts being in neutral position, the operating lever is moved to carry its inner end into engagement with member 35 mounted on shifting rod 21 which carries fork 27 as before explained being in engagement with clutch 10, the hand end of the operating lever being moved rearwardly, thus through the operation of the parts as before described moving clutch 10 into engagement with gear 7 and locking it to part 3 of the main-shaft.

The movement of shifting rod member 35 carries its lug 48 against cam arm 40 rotating rock-shaft 36 and through it moving the free end of arm 50 forwardly thus moving shifting rod 22 forwardly and through fork-body 25 and its fork 28, the latter being in engagement with gear 12 moving it into engagement with clutch 13, thus locking gear 12 to the driven part 4 of the main-shaft.

The drive will then be through driving part 3 of main-shaft, clutch 10, gear 7, gears 18 and 19 on reverse shaft, gear 14, counter shaft 5, gear 17, gear 12, clutch 13 and driven part 4 of main-shaft in reverse direction of rotation to the driving part of main shaft to the mechanism to be driven.

The springs 29 and 32 on shifting rod 20 and 30 and 33 on shifting rod 21 serve to cushion all the movements of these rods and operative connections and especially serve to permit the movement of these shifting rods to their fullest extent at one operation whether the clutching elements engage at that time in locking engagement or not as the springs will serve to force the clutching elements into locking engagement when they are in proper relation.

Spring 31 on shifting rod 22 serves the same purpose in reference to the clutching elements with which fork 28 carried by body 25 on shifting rod 22 is in operative relation.

I prefer that the bearings be of the ball or anti-friction type.

The driving part 3 of the main-shaft has bearing at 66 in the case at its outer end portion and in the driven part 4 of the main-shaft at its inner end. The driven part 4 of the main-shaft has bearing at 67 in the case at its outer end portion and in the bearing 68 at its inner end portion, this bearing being on the periphery or outside of the clutch 13, the latter as before stated being fixed to the inner end portion of the driven part 4 of the main-shaft.

The counter-shaft 5 has bearing 69 at its forward end portion in the case and has an inner bearing 70 within the case. The gear 17 on counter-shaft 5 is of sufficient width so that it is in mesh at all times with gear 12 regardless of the fact whether gear 12 is in locking engagement with clutch 13 or in its neutral or inoperative position as shown in Fig. 1.

The gear 17 is mounted on and fixed to the end portion of counter-shaft 5 beyond the bearing 70.

The shifting rods 20, 21 and 22 have longitudinal movement to a predetermined full extent regardless of the fact as to whether or not the clutch elements come to locking engagement at the time the shifting rods are moved to their limit.

Locking means are provided to hold the shifting rods in their respective extreme positions such locking means, however, being so constructed as to permit the rods to be moved out of such locked position when superior force is exerted either by operation of the shifting lever or otherwise.

One means of locking the shifting rods in their respective extreme positions comprises a spring pressed plunger 71 (see Fig. 9) adapted to enter recesses 72 in the shifting rods. The end portion of the plunger 71 is rounded or tapered so as to permit it to ride on the wall of the opening with which it is in engagement thus permitting the shifting rod to be moved when sufficient force is exerted to overcome the locking force.

Figures 6, 12:
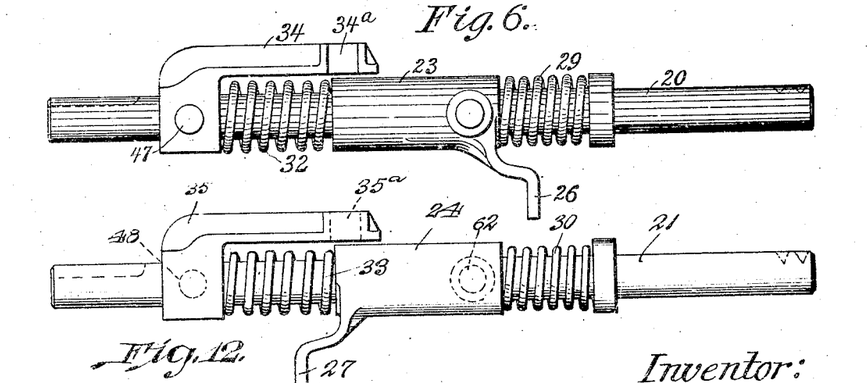
Fig. 12 shows a side view of one of the shifting rods.
Figure 7:
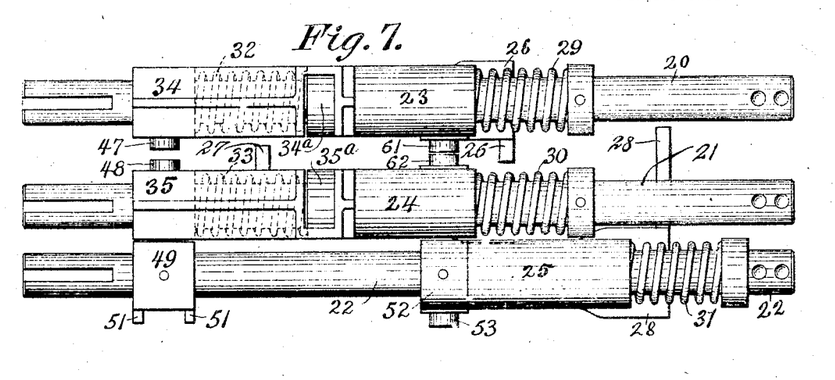
Fig. 7 is a plan view of the shifting rods with a part of their operative mechanism.
Figure 8:
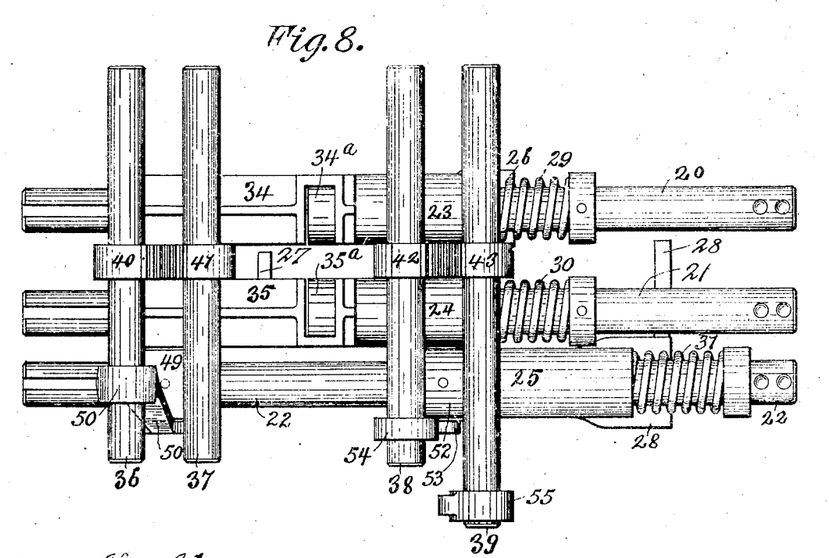
Fig. 8 is a plan view of the same elements showing the rock-shafts mounted above the shifting rods.
Figures 9, 10:
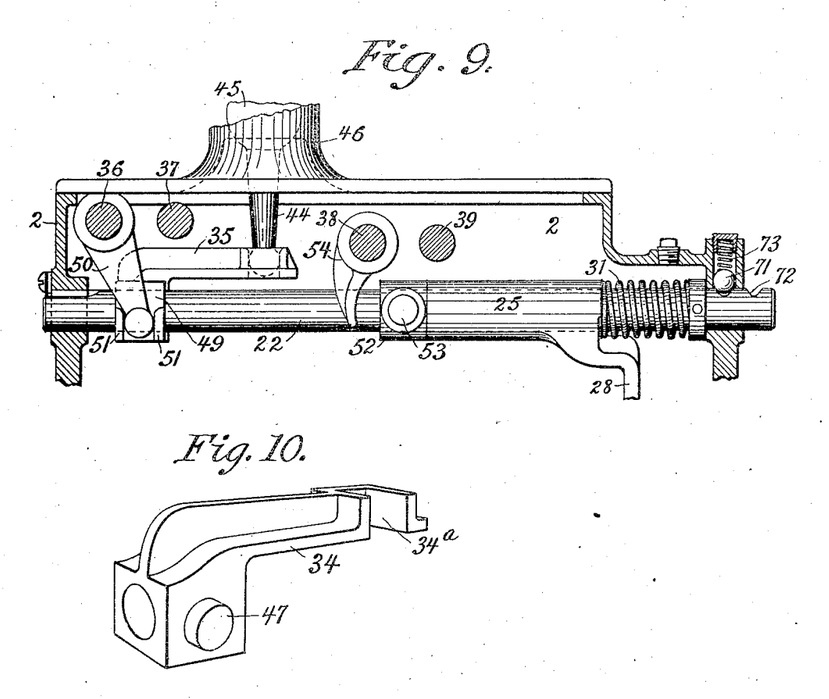
Fig. 9 is a side elevation showing a part of the upper portion of the case in section and showing one of the shifting rods mounted therein.
Fig. 10 is a perspective view of one of the members adapted to be mounted on a shifting rod and to be engaged by a shifting lever, this view being on an enlarged scale.

Spring 32 mounted on shifting rod 20 is shown in full lines in Figs. 1 and 6 and in dotted lines in Fig. 7 but is not shown in Fig. 8 and a like spring on shifting rod 21 is shown in dotted lines in Fig. 7 but not shown in Fig. 8.

By preference the parts will be returned to neutral position by pressure upon the foot treadle, the latter being in operative connection with rod 59. (See Fig. 11). It will readily be seen that a slight pressure on the treadle will move the lever 58 on its pivot thus moving rod 56 forwardly and as the spring pressed pawl 64 engages the free end of cam 55 shaft 39 will be rotated and through the operation of the mechanism as before described all clutch engagements will be opened, this being accomplished without any manipulation of the hand lever.

In the manufacture of the mechanism the shifting rods 21 and 22 will be located more closely adjacent to each other than is shown in Figs. 7 and 8.

It is to be noted that with this mechanism the gears are never running under load when a shift is being made.

Having therefore described my invention what I claim as new and desire to secure by Letters Patent is:—

1. A transmission mechanism comprising a casing, a sectional main shaft composed of a driving part and a driven part in axial alinement and supported by the casing, a counter-shaft supported in the casing, gears provided with clutch members free to rotate upon but held from movement longitudinally along the driving part of the main shaft, a gear provided with a clutch member free to rotate upon and to move longitudinally along the driven part of the main shaft, gears fixed to the counter-shaft and meshing at all times with the gears on the main shaft, clutch members rotatable with and movable along the driving part of the main shaft and adapted to engage with the clutch members of the adjacent gears thereon, a clutch member fixed to the driven part of the main shaft, said fixed clutch member being adapted to be engaged by the clutch member of the sliding gear on the driven part of the main shaft and also with one of the clutch members on the driving part of the main shaft, a shifting lever, mechanism connecting the shifting lever with the movable clutch members on the driving part of the shaft and with the sliding gear on the driven part of the shaft, said mechanism being operable by the movement of the shifting lever to positively move either clutch on the driving part into engagement with an adjacent gear on the driving part and simultaneously move the gear on the driven part into engagement with the clutch on the driven part, and mechanism operable to simultaneously move all of the clutches on the driving part out of engagement with the adjacent gears and the movable gear on the driven part out of engagement with the clutch on the driven part of the shaft.

2. A transmission mechanism comprising a casing, a sectional main shaft composed of a driving part and a driven part in axial alinement and supported by the casing, a counter-shaft supported by the casing, a reverse shaft supported by the casing, gears provided with clutch members free to rotate upon but held from movement longitudinally along the driving part of the main shaft, a gear provided with a clutch member free to rotate upon and to move longitudinally along the driven part of the main shaft, gears fixed to the counter-shaft and meshing with gears on the main shaft, gears on the reverse shaft meshing with gears on the main and counter shafts, clutch members rotatable with and movable along the driving part of the main shaft and adapted to engage with the clutch members of the adjacent gears thereon, a clutch member fixed to the driven part of the main shaft, said fixed clutch member being adapted to be engaged by the clutch member of the sliding gear on the driven part of the main shaft and also with one of the clutch members on the driving part of the main shaft, a shifting lever, mechanism connecting the shifting lever with the movable clutch members on the driving part of the shaft and with the sliding gear on the driven part of the shaft, said mechanism being operable by the movement of a shifting lever to positively move either clutch on the driving part into engagement with an adjacent gear on the driving part and simultaneously move the gear on the driven part into engagement with the clutch on the driven part, and mechanism operable to simultaneously move all of the clutches on the driving part out of engagement with the adjacent gears and the moveable gear on the driven part out of engagement with the clutch on the driven part of the shaft.

3. A transmission mechanism comprising a casing, a sectional main shaft composed of a driving part and a driven part in axial alinement and supported by the casing, a counter-shaft supported in the casing, gears provided with clutch members free to rotate upon but held from movement longitudinally along the driving part of the main shaft, a gear provided with a clutch member free to rotate upon and to move longitudinally along the driven part of the main shaft, gears fixed to the counter-shaft and meshing at all times with the gears on the main shaft, clutch members rotatable with and movable along the driving part of the main shaft and adapted to engage with the clutch members of the adjacent gears thereon, a clutch member fixed to the driven part of the main shaft, said fixed clutch member being adapted to be engaged by the clutch member of the sliding gear on the driven part of the main shaft and also with one of the clutch members on the driving part of the main shaft, a shifting lever, mechanism connecting the shifting lever with the movable clutch members on the driving part of the shaft and with the sliding gear on the driven part of the shaft, said mechanism being operable by the movement of the shifting lever in one manner to positively move either clutch on the driving part into engagement with an adjacent gear on the driving part and simultaneously move the gear on the driven part into engagement with the clutch on the driven part, and operable by the movement of the shifting lever in another manner to lock the driving part directly to the driven part, and mechanism operable to simultaneously move all the clutches on the driving part out of engagement with the adjacent gears and the movable gear on the driven part out of engagement with the clutch on the driven part of the shaft without disengaging any of said gears.

4. In a transmission mechanism a casing, a sectional main shaft composed of a driving part and a driven part in axial alinement, the inner end of one part extending into and being supported by the inner end of the other part of the shaft, bearings in the casing supporting the outer end of the driving part and the outer end of the driven part of the shaft, clutch members movable on the driving part of the shaft, a double clutch member fixed to the inner end of the driven part of the shaft, bearings in the casing surrounding and supporting the said double clutch, a counter-shaft, bearings in the casing supporting the counter-shaft, a plurality of gears provided with clutch members rotarily mounted on said sectional main shaft, a plurality of gears fixed upon the counter-shaft and meshing with the gears on the main shaft, and means for selectively clutching the gears to the sectional main shaft.

5. In a transmission mechanism comprising a casing, a two-part shaft having driving and driven parts, a bearing in the casing supporting the outer end of the driving part and the driven part having a bearing for the inner end of the driving part, a bearing in the casing for the outer end of the driven part and an intermediate bearing in the casing for the inner end of the driven part, said intermediate bearing supporting a member secured to the inner end of the driven part and provided with lateral clutch members, a clutch member on the driving part adapted to slide thereon and engage one of the bearing-supported clutch-members, a gear on the driven part provided with a clutch member and adapted to be moved so that its clutch member engages the other bearing-supported clutch-member, and means to selectively operate said movable parts whereby the same may be locked to and unlocked from the adjacent clutch members.

6. In a transmission mechanism comprising a casing, a two-part shaft having driving and driven parts, a bearing in the casing supporting the outer end of the driving part and the driven part having a bearing for the inner end of the driving part, a bearing in the casing for the outer end of the driven part and an intermediate bearing in the casing for the inner end of the driven part, said intermediate bearing supporting a member secured to the inner end of the driven part and provided with lateral clutch members, a clutch member on the driving part adapted to slide thereon and engage one of the bearing-supported clutch members, a gear on the driven part provided with a clutch member and adapted to be moved so that its clutch member engages the other bearing supported clutch member, a gear rotarily mounted on the driving part of the shaft and provided with a clutch member adapted to be engaged by the clutch member that slides on the driving part of the shaft, and means to selectively operate said movable parts whereby the same may be locked to and unlocked from the adjacent clutch members.

7. In a transmission mechanism comprising a casing, a two-part shaft having driving and driven parts, a bearing in the casing supporting the outer end of the driving part and the driven part having a bearing for the inner end portion of the driving part, a bearing in the casing for the outer end of the driven part and an intermediate bearing in the casing for the inner end of the driven part, said intermediate bearing supporting a member secured to the inner end of the driven part and provided with lateral clutch members, a clutch member on the driving part adapted to slide thereon and engage one of the bearing-supported clutch members, a gear on the driven part provided with a clutch member and adapted to be slid on the shaft so that its clutch member engages the other bearing-supported clutch member, a gear rotarily mounted on the driving part of the shaft and provided with a clutch member, and means for engaging the movable clutch member with the clutch member of the gear on the driving part of the shaft and simultaneously engaging the clutch member of the sliding gear with the clutch member secured to the driven member of the shaft, and simultaneously disengaging these parts.

8. In a transmission mechanism a casing, a sectional shaft comprising a driving part and a driven part supported by the casing, gears rotatably mounted on said shaft parts, means for locking said gears to said shaft parts, longitudinally movable shifting rods, sleeves slidably mounted on said rods, springs thrusting against said sleeves and retaining them in position, and means projecting from said sleeves into engagement with said gear-locking means whereby two of said gears may be simultaneously locked to and unlocked from said shaft parts.

9. In a transmission mechanism a casing, a sectional shaft comprising a driving part and a driven part supported by the casing, gears rotarily mounted on said shaft parts, one of said gears being slidable on the driven shaft part, means for locking said gears to said shaft parts, longitudinally movable shifting rods, sleeves slidably mounted on said rods, springs thrusting against said sleeves, and means projecting from said sleeves into engagement with said gear-locking means and said slidable gear whereby when the shifting rods are operated the sliding gear is slid along and locked to the driven part of the shaft at the same time that another gear is locked to the driving part of the shaft.

10. In a transimssion mechanism a casing, a sectional shaft comprising a driving part and a driven part, gears rotarily mounted on said shaft parts, one of said gears being movable longitudinally of the driven part of the shaft, means for locking said gears to said shaft parts, and means for shifting said locking means comprising longitudinally movable rods, sleeves mounted on said rods and provided with means engaging said gear-locking means, a longitudinally movable rod arranged to move the slidable gear and lock it to the driven part of the shaft, and means connecting the first mentioned rods with the last mentioned rod whereby said last mentioned rod is moved by the movement of the first mentioned rods when those rods are moved to cause the locking of the gears to the driving part of the shaft.

11. In a transmission mechanism a casing, a sectional shaft comprising a driving part and a driven part, gears rotarily mounted on said shaft parts, one of said gears being movable longitudinally of the driven part of the shaft, means for locking said gears to said shaft parts, and means for shifting said locking means comprising longitudinally movable rods, sleeves mounted on said rods and provided with means engaging said gear-locking means on the driving part of the shaft, springs mounted on said rods and bearing against said sleeves, a longitudinally movable rod arranged to move the slidable gear and lock it to the driven part of the shaft, and means connecting the first mentioned rods with the last mentioned rod whereby said last mentioned rod is moved by the movement of the first mentioned rods when those rods are moved to cause the locking of the gears to the driving part of the shaft.

12. In a transmission mechanism a casing, a sectional shaft comprising a driving part and a driven part supported by the casing, gears rotarily mounted on the driving part of said shaft and adapted to be selectively locked thereto, a single gear rotarily mounted on the driven part of the shaft and adapted to be moved laterally and locked thereto, means for locking the gears on the shaft parts, means for locking the shaft parts together, two shifting rods having longitudinal movement and provided with forks in engagement with the locking means on the driving part of the shaft, another shifting rod having a fork engaging with the slidable gear on the driven part of the shaft, operative mechanism between said shifting rods whereby the last mentioned shifting rod is moved by each movement of the first mentioned shifting rods except such movement as operates to lock the two parts of the shaft together.

13. In a transmission mechanism a casing, a sectional shaft comprising a driving part and a driven part supported by the casing, gears rotarily mounted on the driving part of said shaft and adapted to be selectively locked thereto, a single gear rotarily and slidably mounted on the driven part of the shaft, means for locking the gears on the shaft parts, two shifting rods having longitudinal movement and provided with forks in engagement with the locking means on the driving part of the shaft, another shifting rod having a fork engaging with the slidable gear on the driven part of the shaft, operative mechanism between said shifting rods whereby the last mentioned shifting rod is moved by the movement of either of the first two shifting rods as they move to lock the gears to the shaft parts.

14. In a transmission mechanism, a sectional main shaft having a driving part and a driven part in axial alinement, a countershaft, gears intermeshing at all times mounted on said shafts for the transmission of power at different speeds, clutches slidingly mounted on both sections of the main shaft and adapted to engage and lock the gears on the main shaft parts, a neutralizing member operatively connected with the clutches, and means for actuating said neutralizing member, whereby when the neutralizing member is actuated all the clutches are disengaged.

15. In a transmission mechanism, a sectional main shaft having a driving part and a driven part in axial alinement, a countershaft, gears intermeshing at all times mounted on said shafts for the transmission of power at different speeds, clutches sliding on the main shaft and adapted to engage and lock the gears on the main shaft parts, means for selecting and positively sliding the clutches in both directions, a neutralizing member operatively connected with the clutch operating means, and means for actuating said neutralizing member, whereby when the neutralizing member is actuated all the clutches are disengaged.

16. In a transmission gearing a casing, a sectional main shaft having a driving part and a driven part in axial alinement mounted in said casing, gears rotarily mounted on said shaft, clutches mounted on said shaft and adapted to be moved laterally to lock said gears to said shaft, a counter-shaft, intermediate gears on said counter-shaft and in mesh with the gears on the main shaft, three longitudinally movable shifting rods, means carried by said shifting rods and engaging said clutches, a neutralizing rod, a rock shaft in operative connection with said neutralizing and shifting rods, and means for actuating said neutralizing rod and through the rock shaft causing the shifting rods to move the clutches out of locking engagement.

17. In a transmission mechanism, a two-part shaft including a driving part and a driven part in axial alinement, clutch members arranged to lock the two parts together, gears with clutch members rotarily mounted on said driving part, clutch members slidingly mounted on said driving part and adapted to lock the adjacent gears thereto, a clutch member fixed on said driven part, a gear loosely mounted on said driven part and adapted to be moved laterally into engagement with the clutch member thereon, three shifting rods, two in operative connection with the clutch members on the driving part and one in operative connection with the gear on the driven part, means for moving the said two rods at will in either direction, connections between said two rods and the other rod whereby the gear on the driven part of the shaft is put into locking engagement with the adjacent clutch member by movement of either of said two shifting rods, a counter-shaft having gears fixed thereto, a reverse shaft having a gear thereon, all of said gears being in constant mesh, but in action only when some one of the loosely mounted gears on the driving part of said shaft is locked thereto.

WILLIAM A. McCARRELL.